US010223547B2

(12) United States Patent
Rane et al.

(10) Patent No.: US 10,223,547 B2
(45) Date of Patent: Mar. 5, 2019

(54) METHOD FOR DIFFERENTIALLY PRIVATE AGGREGATION IN A STAR TOPOLOGY UNDER A REALISTIC ADVERSARIAL MODEL

(71) Applicant: Palo Alto Research Center Incorporated, Palo Alto, CA (US)

(72) Inventors: Shantanu Rane, Menlo Park, CA (US); Vincent Bindschaedler, Urbana, IL (US); Alejandro E. Brito, Mountain View, CA (US); Ersin Uzun, Campbell, CA (US); Vanishree Rao, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 189 days.

(21) Appl. No.: 15/290,738

(22) Filed: Oct. 11, 2016

(65) Prior Publication Data

US 2018/0101697 A1  Apr. 12, 2018

(51) Int. Cl.

| | |
|---|---|
| *G06F 7/04* | (2006.01) |
| *G06F 17/30* | (2006.01) |
| *H04N 7/16* | (2011.01) |
| *G06F 21/62* | (2013.01) |
| *H04L 9/08* | (2006.01) |
| *G06F 21/60* | (2013.01) |
| *H04L 9/00* | (2006.01) |

(52) U.S. Cl.
CPC ........ *G06F 21/6245* (2013.01); *G06F 21/602* (2013.01); *H04L 9/008* (2013.01); *H04L 9/085* (2013.01); *H04L 2209/08* (2013.01); *H04L 2209/16* (2013.01)

(58) Field of Classification Search
CPC combination set(s) only.
See application file for complete search history.

(56) References Cited

U.S. PATENT DOCUMENTS

| | | | |
|---|---|---|---|
| 2012/0143922 A1* | 6/2012 | Rane ................. | G06F 17/30539 707/803 |
| 2012/0204026 A1* | 8/2012 | Shi ........................ | H04L 9/3006 713/155 |
| 2017/0272246 A1 | 9/2017 | Rane | |

OTHER PUBLICATIONS

Acs., G., et al. I have a DREAM! (differentially private smart metering). In Information Hiding, pp. 118-132, 2011.
Ben-Or, M., et al. Completeness theorems for non-cryptographic fault-tolerant distributed computation. In Proceedings of the twentieth annual ACM symposium on Theory of computing, pp. 1-10, 1988.
Bilogrevic, I. et al., What's the gist? privacy-preserving aggregation of user profiles. In Computer Security—ESORICS 2014, pp. 128-145, 2014.

(Continued)

*Primary Examiner* — Brandon S Hoffman
*Assistant Examiner* — Samuel Ambaye
(74) *Attorney, Agent, or Firm* — Fay Sharpe LLP

(57) ABSTRACT

One embodiment provides a system for noise addition to enforce data privacy protection in a star network. In operation, participants may add a noise component to a dataset. An aggregator may receive the noise components from the plurality of participants, compute an overall noise term based on the received noise components, and aggregate values using the noise components and overall noise term.

13 Claims, 7 Drawing Sheets

(56) References Cited

OTHER PUBLICATIONS

Chan, T-H. H., Privacy-preserving stream aggregation with fault tolerance. In Financial Cryptography and Data Security, pp. 200-214. 2012.
Damgard, I, et al. A generalization of Paillier's public-key system with applications to electronic voting. International Journal of Information Security, 9(6):371-385, 2010.
Dwork, C, et al. The algorithmic foundations of differential privacy. Theoretical Computer Science, 9(3-4):211-407, 2013.
Dwork, C. et al., Differential privacy: A survey of results. In Theory and applications of models of computation, pp. 1-19. Springer, 2008.
Erkin, Z. et al. Privacy-preserving data aggregation in smart metering systems: An overview. Signal Processing Magazine, IEEE, 30(2):75-86, 2013.
Erkin, Z. et al., Private computation of spatial and temporal power consumption with smart meters. In Applied Cryptography and Network Security, pp. 561-577, 2012.
Garcia. F. et al., Privacy-friendly energy-metering via homomorphic encryption. In Security and Trust Management, pp. 226-238. 2011.
Jawurek, M. et al. Fault-tolerant privacy preserving statistics. In Privacy Enhancing Technologies, pp. 221-238, 2012.
Jove, M. et al. A scalable scheme for privacy preserving aggregation of time-series data. In Financial Cryptography and Data Security, pp. 111-125. 2013.
Knuth, D. E., Seminumerical Algorithms, The art of computer programming, vol. 2, Section 4.6, 1981.
Koltz, S., et al. The laplace distribution and generalizations, 2001.
Kursawe, K., et al. Privacy-friendly aggregation for the smart-grid. In Privacy Enhancing Technologies, pp. 175-191, 2011.
Leontiadis, I., et al. Private and dynamic time-series data aggregation with trust relaxation. In Cryptology and Network Security, pp. 305-320. Springer, 2014.
Mironov, I., On significance of the least significant bits for differential privacy. In Proceedings of the 2012 ACM conference on computer and communications security, pp. 650-661. ACM, 2012.
Nissim, R., et al., Smooth sensitivity and sampling in private data analysis. In Proceedings of the thirty-ninth annual ACM symposium on Theory of computing, pp. 75-84. ACM, 2007.
Pallier, P., Public-key cryptosystems based on composite degree residuosity classes. In Advances in cryptology, EURO-CRYPT99, pp. 223-238, 1999.
Rane. S., et al. Privacy, efficiency and fault tolerance in aggregate computations on massive star networks. In IEEE Workshop on Information Forensics and Security (WIFS 2015), Rome, Italy, Nov. 2015.
Shamir, A. How to share a secret. Communications of the ACM, 22(11):612-613, 1979.
Shi, E., et al., Privacy-preserving aggregation of time-series data. In NDSS, vol. 2, p. 4, 2011.
Stern, J., A new and efficient all-or-nothing disclosure of secrets protocol. In Advances in Cryptology—ASIACRYPT'98, pp. 357-371. Springer, 1998.

* cited by examiner

US 10,223,547 B2

METHOD FOR DIFFERENTIALLY PRIVATE AGGREGATION IN A STAR TOPOLOGY UNDER A REALISTIC ADVERSARIAL MODEL

BACKGROUND

The present application relates generally to ensuring data privacy while aggregating data. More specifically, the present application relates to ensuring data privacy via the addition of noise in a star network.

In today's world, a vast amount of digital content from a large number of devices is continually generated. Local data may be sent to an aggregation entity, which can aggregate such data for measurement. In one example, smart meters may send power consumption data to a utility company for data aggregation. In another example, health monitoring entities may aggregate fitness-related data provided by smartwatches, smartphones, and so forth. In yet another example, online entities may aggregate data from browser activity from Internet users. Such entities that are aggregating data may be referred to as the aggregator.

Users may sometimes consent to the aggregation of their own data in return for value-added services. However, the users may also be reluctant to share personal information about their individual behavior. In the above examples, power usage data reveal information about the homeowner's daily patterns, fitness data may reveal sensitive medical information, and browser activity can reveal intimate details of an individual's life. There is a privacy concern in this interaction between untrusted entities in that the data held by any individual user should not be revealed to any other participant or the aggregator.

The following provides a new and improved systems and methods which overcome the above-referenced problems and others.

INCORPORATION BY REFERENCE

U.S. patent application Ser. No. 15/073,330 (FAULT-TOLERANT AGGREGATION OF ENCRYPTED DATA IN A STAR NETWORK) is hereby incorporated by reference in its entirety.

BRIEF DESCRIPTION

In accordance with one aspect of the present application, a system includes one or more processors. The one or more processors may include a plurality of participants, each participant of the plurality of participants being configured to add a noise component to a dataset. The one or more processors may further include an aggregator configured to: receive the noise components from the plurality of participants; compute an overall noise term based on the received noise components; and aggregate values using the noise components and overall noise term.

In accordance with another aspect, there is a computer-implemented method for noise addition to enforce data privacy, the method comprising: receiving noise components from each participant of a plurality of participants; generating binary sequences; encrypting the binary sequences to form ciphertexts; sending the ciphertexts to participants of the plurality of participants; selecting noise components based on the binary sequences to generate an overall noise term; receiving a value from each participant of the plurality of participants, the value computed based on a generated noise component and a generated binary sequence; and aggregating the computed values with a private aggregation protocol.

In accordance with yet another aspect, there is system for implementing differential privacy, the system including one or more processors. The system further includes a storage device storing instructions that when executed by the one or more processors cause the one or more processors to perform a method, the method comprising: receiving noise components from each participant of a plurality of participants; generating binary sequences; encrypting the binary sequences to form ciphertexts; sending the ciphertexts to participants of the plurality of participants; selecting noise components based on the binary sequences to generate an overall noise term; receiving a value from each participant of the plurality of participants, the value computed based on a generated noise component and a generated binary sequence; and aggregating the computed values with a private aggregation protocol.

DETAILED DESCRIPTION

Overview

The systems and methods described herein solve the problem of computing an aggregate function (e.g., a summation, weighted summation, count, histogram, or so forth) of data held by several participants who cannot communicate with each other. The participants can only communicate with an aggregator, who discovers and publishes the result. A network topology in which these concepts are explained is in a strict start topology 100 such as depicted in FIG. 1.

Figure 1:
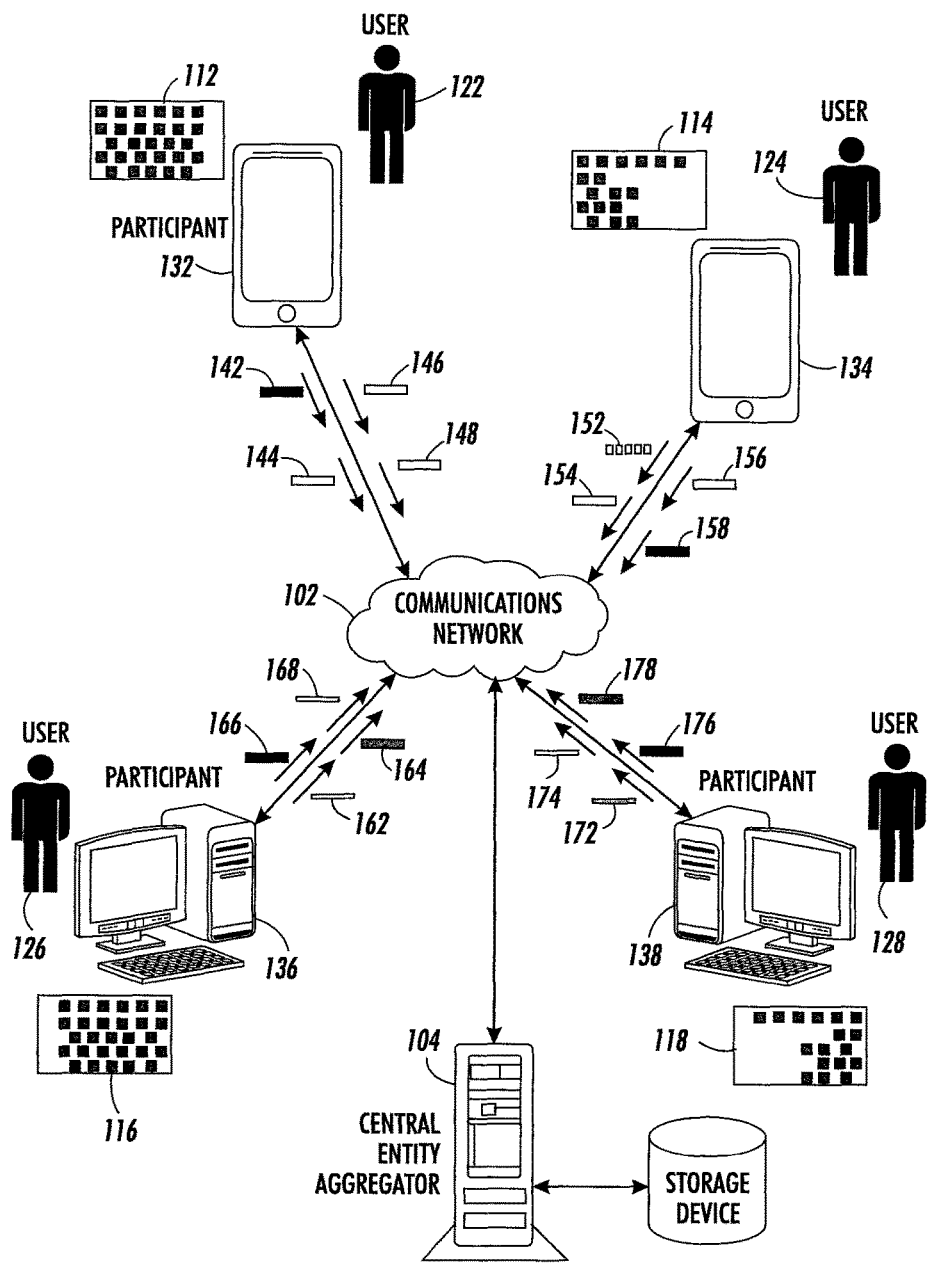
FIG. 1 illustrates an exemplary distributed collection of data for individual participants via a star network.

FIG. 1 illustrates an exemplary distributed collection of encrypted data for individual participants via a star network, in accordance with an embodiment of the present invention. In this example, a large number of participants 132, 134, 136, and 138 are coupled to a communications network 102. In some embodiments, these participants are user devices for users 122, 124, 126, and 128, respectively. It should be noted that the user data generated from a user device may not depend on a user's direct interaction with the device (e.g., a smart meter measuring electricity usage at the home of a user). Participants 132, 134, 136, and 138 are only coupled to a central entity 104 and not with each other.

In some embodiments, central entity 104 can operate as an aggregator 104, which can collect and aggregate input data from participants 132, 134, 136, and 138 for computing a target value of interest (e.g., average power usage in a month). Examples of such aggregation include, but are not limited to, summation, weighted summation, histogram, mean, variance and higher moments, linear combinations, classifier, and count query. Such aggregation requires obtaining the target value of interest without exposing any individual participant's data to aggregator 104. However, in star network 102, the encrypted data from participants 132, 134, 136, and 138 does not have a common key. If aggregator 104 distributes a common key, the data from participants 132, 134, 136, and 138 becomes exposed to aggregator 104. Furthermore, a key management entity can also expose the data from participants 132, 134, 136, and 138 to aggregator 104. In addition, if a participant, such as participant 132, becomes unavailable, the target value of interest computed by aggregator 104 becomes error-prone.

To solve this problem, aggregator 104, in conjunction with participants 132, 134, 136, and 138, facilitates fault-tolerant aggregation of encrypted data in network 102. Suppose that participants 132, 134, 136, and 138 have input data 112, 114, 116, and 118, respectively, for aggregator 104. During operation, aggregator 104 sends a large prime number, to participants 132, 134, 136, and 138. Upon receiving the prime number, participant 132 generates a polynomial, which includes a constant coefficient representing input data 112 and a set of secret coefficients. In some embodiments, the polynomial can be of the form: $p^{(i)}(x)=d_i+p_1^{(i)}x+p_2^{(i)}x^2+ \ldots +p_n^{(i)}x^n$ mod p. Here, $d_i$ represents input data 112. If there are m participants, n<m. It should also be noted that evaluating the polynomial at a value of "0" yields input data 112 (i.e.,) $p^{(i)}(0)=d_i$, wherein i corresponds to participant 132. Participant 132 evaluates the polynomial at four distinct known points to generate participant values 142, 144, 146, and 148 for participants 132, 134, 136, and 138, respectively. Here, each distinct point corresponds to a participant.

Participant 132 encrypts participant values 142, 144, 146, and 148 using the public keys of participants 132, 134, 136, and 138, respectively. Suppose that a distinct point j is associated with participant 132. If $k_j$ is a public key for participant 132, the encrypted participant value 142, which is referred to as a ciphertext of participant value 142, can be $E_{k_j}(p^{(i)}(j))$. Here, $E_{k_j}$ represents a ciphertext generated based on $k_j$. Participant 132 then sends $E_{k_j}(p^{(i)}(j))$ to aggregator 104. Similarly, participant 132 sends ciphertexts of participant values 144, 146, and 148 to aggregator 104. In some embodiments, the communication between a participant and aggregator 104 includes generating a message, including the value in the message, determining an output for the message, and transmitting the message via the output port.

Similarly, participant 134 evaluates its polynomial at the same four distinct known points, as used by participant 132, to generate participant values 152, 154, 156, and 158 for participants 132, 134, 136, and 138 respectively. In the same way, participant 136 evaluates its polynomial at the same four distinct known points to generate participant values 162, 164, 166, and 168 for participants 132, 134, 136, and 138 respectively. Participant 138 evaluates its polynomial at the same four distinct known points to generate participant values 172, 174, 176, and 178 for participants 132, 134, 136, and 138 respectively. In other words, participants 132, 134, 136, and 138 evaluate the polynomial at the same four distinct known points. Participant 134 encrypts participant values 152, 154, 156, and 158 using the public keys of participants 132, 134, 136, and 138, respectively. Similarly, participant 136 encrypts participant values 162, 164, 166, and 168, and participant 138 encrypts participant values 172, 174, 176, and 178 using the public keys of participants 132, 134, 136, and 138, respectively. Participants 134 136, and 138 then send their respective ciphertexts to aggregator 104. FIG. 1 also shows storage device 106.

To preserve privacy, several privacy constraints may be imposed. Specifically, these constraints are:

1. The aggregator should not discover the data of any of the participants.
2. The participants should not discover each other's data.
3. A third party who observes the aggregate function should not be able to identify any of the participants based on their contribution to the aggregate function.

Figure 2:
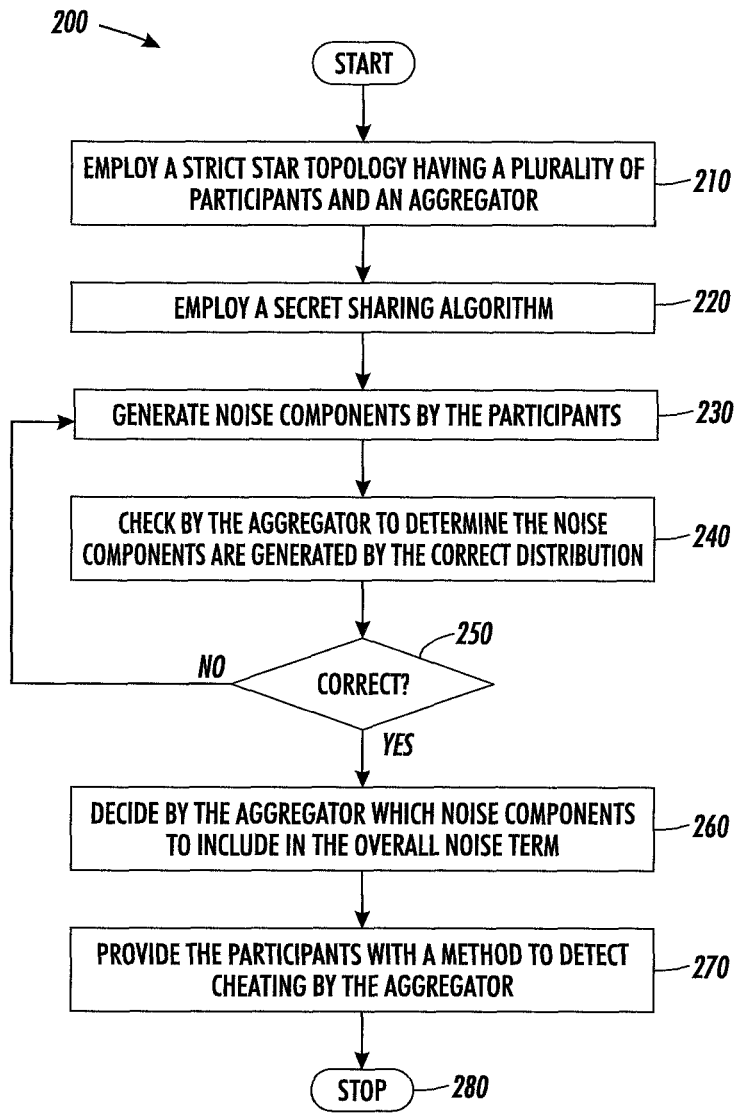
FIG. 2 is an overall flowchart of an embodiment of the present invention.

Flow diagram 200 of FIG. 2 describes an embodiment of how the above constraints may be achieved. With reference thereto, 210 shows a step of employing a strict star topology having a plurality of participants and an aggregator. 220 shows a step of employing a secret sharing algorithm. 230 shows a step of generating noise components by the participants. 240 shows a step of checking by the aggregator to determine if the noise components are generated according to the correct distribution. In 250, it is checked if the distribution is correct. If not, the depicted flow diagram procedure returns to 230. If so, the method proceeds to 260 and it is decided by the aggregator which noise components to include in the overall noise term. 270 shows a step of providing the participants with a method to detect cheating by the aggregator. 280 shows the end of flow diagram 200.

The systems and methods described herein employ a strict star topology (e.g., a massive number of participants (e.g. four or more participants) connected to a single untrusted aggregator) and Shamir Secret Sharing amongst the participants. Shamir Secret Sharing is a known cryptographic algorithm, where a secret is divided into parts. Each participant of the star topology is provided a part of the secret. Then, the secret is reconstructed using at least some of the parts. It is understood that other cryptographic algorithms may be used. This satisfies the first two above-mentioned privacy constraints.

The third privacy constraint is achieved by the following approach:

1. Make the participants generate noise samples.
2. Make the aggregator decide which noise samples to add to the final aggregate function result. Provide the participants with a method to check that the correct number of noise samples is added, to ensure privacy from the aggregator and third parties.

Prior systems all consider semi-honest adversaries (e.g., adversaries that follow a set of rules, but that may still attempt to discover the data of other participants) and do not even allow certain harmful collusions amongst parties. In contrast, the systems and methods described herein are different, and provide advantages over these prior systems, including but not limited to:

1. All semi-honest collusions are allowed and there is a precise analysis that shows the effect of coalition size on privacy loss.
2. The aggregator is more powerful than a semi-honest adversary because the aggregator may want to add less noise than prescribed (or even add no noise at all). The systems and methods described herein discover such adversarial actions and prevent them from taking place.

The systems and methods described herein provide a new, more realistic adversarial model. It is considered that formerly known semi-honest models are too lenient to be applied in practice, and many of the malicious models do not account for the incentives of the participants. The systems and methods described herein may also defend against an adversarial model. Thus, the systems and methods described herein perform efficient, fault-tolerant, privacy-preserving aggregate computations.

In the systems and methods described herein, a protocol based on Shamir secret sharing and homomorphic encryption is employed for computing the aggregate function, without assuming any additional parties. Thus, we consider a strict star topology (e.g., each of the participants can communicate only with the aggregator, and never with any of the other participants). Clearly, the data generated by a participant should not be revealed to the other participants. Another privacy requirement is referred to as Aggregator Obliviousness which means that the aggregator discovers only a noisy version of the aggregate function being computed and nothing else about the inputs of the individual participants (e.g. when an aggregator "obliviously computes," the aggregator computes the overall noise term without learning the overall noise term). First, the simplest aggregate function, namely the sum of the participants' data is considered. Later, how to extend the summation protocols to the computation of other aggregate measures such as counts and histograms is described.

1 Introduction

Aggregate computations are the among the most basic and widely used primitives in today's networked environments. These computation usually involve a server (aggregator) computing aggregate measures, e.g., histograms, weighted summations, averages, etc., using data gathered from several devices (participants). The systems and methods described herein relate to application scenarios in which participants and the aggregator form a star network, and the privacy of the participants must be protected. The need for privacy-preserving aggregate computations arises in numerous applications: telemetry from Internet-of-Things (IoT) devices, analytics on medical data furnished by wearables, smart grid power aggregation, histograms of websites visited by users of a particular browser, to name a few.

Participants in the Internet economy generally allow their data to be used by service providers (aggregators), as a fair exchange for the services they provide. However, there is a growing concern that our data may be used for purposes that the participants did not sanction. For example, smart meter readings can reveal a homeowner's life patterns, fitness apps may reveal private medical conditions, and browser activity and metadata reveals intimate details of a person's life and values. Furthermore, if the service provider is affected by a data breach, sensitive data belonging to unsuspecting individuals falls into the hands of an adversary.

Two kinds of privacy formulations may be used to express and resolve the above concerns. The first formulation, based on secure multiparty computation, is used to directly express which parties can communicate and how parties withhold knowledge of their data from other parties. In a star network, the main privacy constraint is that the data held by any individual participant should not be revealed to other participants, and also not to the aggregator. The aggregator should discover only the specified aggregate measure such as the summation or the probability distribution and nothing else. Additional constraints may be dictated by practical deployment. One such constraint, in a star network, is that the participants can communicate with the aggregator but may not be able to communicate with one another. A second constraint is that the participants cannot all be expected to remain online simultaneously while the protocol is being executed. Thus, an aggregation protocol must enable the aggregator to compute the correct result, while satisfying the privacy constraints and communication constraints, even when users dynamically join and leave.

The second formulation, based on differential privacy, is used to express how difficult it is for an adversary to observe the result of a computation, and make inferences about the protocol's participants. Suppose that the aggregator publishes the final result of the data aggregation protocol, e.g., the average power consumption, and makes it available to an analyst. Then, differential privacy quantifies the degree of confidence with which the analyst can claim that a particular participant, e.g., Alice, participated in the protocol. Seen another way, if the analyst repeated the protocol after Alice moved out of the neighborhood, he would discover Alice's power consumption, even if the protocol didn't directly reveal Alice's data to the analyst. A differentially private mechanism would modify the result, for example, the average power consumption in a way that makes it hard for the analyst to discover Alice's power consumption. This is clearly a different notion of privacy compared to that encountered in secure multiparty computation. The systems and methods described herein are concerned with situations where both kinds of privacy are desired.

2. Overview of Other Approaches

Addressing the privacy concerns related to multiparty computation is challenging predominantly because of the key management problem. Concretely, each participant should obfuscate its input so that all the obfuscated inputs can later be combined—for example, by means of a homomorphic cryptosystem—by the aggregator to reveal the aggregate function. However, this is not straightforward for the star network topology because each participant encrypts using its own unique key. Below, a short overview of attempts to solve this problem is presented. For more details the reader is referred to a comprehensive review by Z. Erkin, J. R. Troncoso-Pastoriza, R. Lagendijk, and F. Perez-Gonzalez. Privacy-preserving data aggregation in smart metering systems: An overview. *Signal Processing Magazine, IEEE*, 30(2):75-86, 2013.

Some works have considered an aggregation protocol that assumes a trusted dealer that distributes encryption keys to the participants, and ensures that the keys vanish when the aggregator combines the result in a prescribed way. A similar approach is to compute means, variances and higher moments of distributions. Rather than assuming a trusted dealer, another approach is to distribute the task of computation and the decryption between an untrusted aggregator and an untrusted key managing authority. This is an efficient approach with a single public key homomorphic cryptosystem, that has only O(m) overhead, where m is the number of participants. However, it introduces an extra participant, and introduces the risk of catastrophic privacy loss if the key managing authority colludes with the aggregator. Another approach proposed a different solution that allows each participant to use a different encryption key, while distributing the knowledge of the overall decryption key between the aggregator and an extra party called the collector. Similar to the previous approach, their scheme forbids collusions between the aggregator and the collector.

Though additive secret sharing requires pairwise information exchange amongst the participants, this approach can still be considered in star networks, by allowing the participants to communicate via the aggregator. Specifically, one approach employed public key encryption to send encrypted shares of the participants' data (or keys) to a subset of participants (termed "leaders") via the aggregator. The leaders add their own shares such that their effect vanishes upon combination, revealing only the sum of the participants' data. Another approach presented a protocol in which a participant homomorphically encrypts each share by using the public-key of each share's intended recipient, but only sends it to the aggregator. The aggregator then homomorphically combines the encrypted shares, requests the decryption of partial summations from each participant, and combines the partial sum to reveal the final sum, but nothing else. This approach has been generalized via the use of Shamir secret sharing, which provides fault tolerance in addition to collusion resistance. In a strict star topology, all these approaches incur $O(m^2)$ ciphertext communication overhead at the aggregator.

Further efforts on this topic, relax the strict star network topology in exchange for a gain in efficiency. One approach allows the participants (smart meters) to communicate with one another, exchanging random values before each smart meter communicates with the aggregator. This is a mode of secret sharing, in which the randomized values are chosen to vanish when the aggregator computes the sum. Another approach allows each participant to communicate with a small number of other participants. These works show that by allowing a limited amount of communication amongst the participants, the ciphertext overhead of the protocol immediately becomes manageable, i.e., $O(m)$. On the other hand, if any participant leaves before the shares are combined, the final sum computed by the aggregator becomes error prone. Though there is no proof, it has been suggested that a $O(m)$ ciphertext overhead may not be achievable, in general, for fault-tolerant aggregation with a star topology. Indeed, the inventors of the present application are not aware of any protocol that achieves this. An improvement toward $O(m)$ overhead, has nevertheless, been attempted. Dividing the star-connected participants into a logical hierarchy composed of several "cohorts" of participants, it is possible to achieve a protocol complexity of $O(m^{1+\rho})$. By an appropriate choice of the cohort size, $\rho$ can be made small.

Some of the schemes discussed above, have also proposed mechanisms to achieve differential privacy. Recognizing that the aggregator has an incentive to obtain the most accurate aggregate value as possible, these studies have entrusted the task of noise addition to parties other than the aggregator. This is a departure from the differential privacy literature produced by the machine learning community, in which the database curator is trusted to add the correct amount of noise. For example, in one approach, the participants generate samples from the two-sided geometric distribution (a discrete version of the Laplace distribution), which add up to provide a differentially private summation of the participants' inputs. Similarly, in another approach the participants generate Gamma-distributed noise samples, which add up to a Laplace-distributed noise term at the aggregator.

Unfortunately, as will be seen, this approach of having the participants add noise samples is not sufficient to preserve differential privacy. In particular, the inventors of the present application consider that collusions of semi-honest participants can subtract out their noise terms and reduce the differential privacy of honest parties.

In contrast to the above-described prior systems, the systems and methods described herein present a protocol in which the participants and the aggregator must interact to determine the noise term. More importantly, protocol of the systems and methods described herein is designed such that neither the participants nor the aggregator know the noise terms that have contributed to the differentially private output. Since the aggregator has an incentive to cause less noise to be added than necessary, the systems and methods described herein present a protocol that can detect a cheating aggregator.

3. Adversarial Framework or Model

The systems and methods described herein involve a strict star topology, i.e., each of the participants can communicate only with the aggregator, and never with any of the other participants. Below, several aspects of the adversarial model are explained. The explanation below is intended to convey the broad requirements, thus notation is kept at a minimum. Later on, following the description of protocols, it will be explained in more detail how these requirements are satisfied.

3.1 Participant & Aggregator Obliviousness

Consider that the participants' data elements $d_i$ are collected in a vector denoted by d. Participant Obliviousness, i.e., the input data, $d_i$, of a participant should not be revealed to the other participants. Further, Aggregator Obliviousness, which means that the aggregator discovers only the aggregate function being computed and nothing else about the inputs of the individual participants, is required. In our protocols, we will first consider the simplest aggregate function, namely the sum of the participants' data. Later, we will describe how to extend the summation protocols to the computation of other aggregate measures such as counts and histograms.

A typical assumption in studies of this kind is that the aggregator and all the participants are semi-honest (honest but curious), i.e., they will follow the protocols but, at each step, they may attempt to discover the data held by honest participants. In particular, the participants and aggregator do not provide false or spurious inputs to the protocol. During privacy analysis, it then becomes necessary to consider the view of semi-honest participants, and collusions of semi-honest participants.

Some prior works have assumed semi-honest parties but do not allow certain collusions. For example, in one known scheme, the aggregator may not collude with a key authority. In another known scheme, the aggregator may not collude with the collector. While these caveats are made in the interest of practical realizability, they present potentially serious concerns, because the forbidden collusion results in catastrophic privacy loss for all honest participants. The goal of the systems and methods described herein, therefore, is to design aggregation protocols that protect against privacy loss under collusions of all kinds. The systems and methods described herein go a step further than this by assuming that while the participants are semi-honest, the aggregator is strictly stronger than semi-honest in the sense that we describe below.

3.2 Differential Privacy (DP)

Aggregator obliviousness is not enough when the aggregator (or an adversary that corrupts the aggregator) has side information about the participants. For example, if this side information consists of the sum of the inputs of m−1 out of m participants, then running a privacy-preserving aggregation protocol with m participants trivially reveals the remaining participant's input. Therefore, to protect attacks against adversaries armed with background information, a differentially private aggregation mechanism is required.

Let d' denote a vector that differs from d in only a single entry. This can be achieved by adding an element to d, or removing a single element from d, or by modifying the value of a single element in d. In this case, d and d' are referred to as adjacent data sets.

Then, $(\epsilon, \delta)$—Differential Privacy is defined as follows:

DEFINITION 1. $(\epsilon, \delta)$-Differential Privacy: An algorithm or protocol or mechanism $\mathcal{M}$ is said to satisfy $(\epsilon, \delta)$-Differential Privacy if, for all adjacent data sets d and d', and for all sets $S \subseteq$ Range $(\mathcal{M})$, $$P(\mathcal{M}(d) \in S) \in S) \leq e^{\epsilon} \cdot P(\mathcal{M}(d') \in S) + \delta$$

As a consequence of this definition, a differentially private protocol produces nearly indistinguishable outputs for adjacent data sets, thus preserving the privacy of the element that is different in d and d'. The amount of indistinguishability is controlled by the parameters $\in$ and $\delta$ with lower values implying greater privacy. Differential privacy can be achieved in many ways: One approach is output perturbation, which involves first computing a function of the data set and then adding noise to the function result. Another approach is input perturbation, which involves first adding noise to the data before evaluating the function result. In either case, a differentially private mechanism will ensure that the function value revealed to the aggregator at the end of the protocol, will contain some additive noise which will protect the participants against attackers equipped with background information. The amount of noise that needs to be added the final aggregate function $f$ depends on the parameters $\in$, $\delta$, and the "global sensitivity" of the function $f$, denoted by $\Delta$ and defined as $$\Delta = \max_{d,d'} \|f(d) - f(d')\|_1$$

for all adjacent data sets d and d'.

For example, $(\in, 0)$-Differential Privacy can be achieved by evaluating the function $f$ and adding noise sampled from a Laplace distribution with scale parameter $\Delta/\in$. Also, $(\in, \delta)$-Differential Privacy can be achieved by evaluating the function $f$ and adding noise sampled from a Gaussian distribution with zero mean and variance $$\frac{\Delta}{\epsilon}$$

ln $(1/\delta)$. Other mechanisms are possible in which the noise term is sampled from a different distribution, and is based on the "local sensitivity" rather than the "global sensitivity." In the scenario of computing aggregate functions on star networks, adding noise to a function value evaluated at the aggregator is not straightforward owing to the competing incentives of the participants and the aggregator which will now be elaborated.

3.3 Secure Multiparty Differential Privacy

Since, it is of interest to provide differential privacy to the participants, there are interesting adversarial scenarios that are not captured by pure secure multiparty computation or conventional differentially private mechanisms. These adversarial scenarios will now be discussed.

Firstly, the aggregator wants the revealed aggregate result to be as accurate as possible. Thus, the aggregator has an incentive to add a small (rather than large) amount of noise (even no noise at all), which would result in insufficient differential privacy for the participants. In most of the prior literature on differentially private machine learning, the database curator is the entity that adds noise to the data. When the curator (or analyst, or aggregator) himself has the incentive to obtain accurate measurements, he cannot be trusted to add the correct amount of noise to ensure differential privacy for the participants. In the systems and methods described herein, the aggregator is strictly stronger than a semi-honest adversary, in the sense that he can try to influence the noise term that is added to the aggregate.

It may seem that the way to prevent this situation is to ask the participants, rather than the aggregator, to generate noise values. However, even this is not sufficient, owing to the differential privacy requirement. Consider the case in which the aggregator is following the protocol and one participant is honest, but all the other participants form a collusion. The colluding participants will now discover the noisy summation output by the aggregator, from which they can subtract their own inputs and their own noise contributions. This leaves the noisy contribution of the honest participant, which may not guarantee differential privacy, in general. Thus, it is not sufficient to trust the semi-honest participants to generate noise values.

Note that in earlier work, the above situation is avoided by requiring that some fraction of the participants must remain honest, and that these honest participants must add enough noise to ensure differential privacy. Other earlier work, does not consider differential privacy, hence a collusion of m−1 out of m participants trivially compromises the data of the remaining honest participant even if the aggregator remains honest. One goal of the systems and methods described herein is to design a differentially private aggregation protocol in which the lone honest participant is protected even when all other participants collude (provided the aggregator stays honest). One way to achieve this is to have the participants generate noise samples, and make the aggregator blindly pick only a subset of those samples, unbeknownst to the participants. Our protocols will make this notion clear.

The described adversarial model is more realistic than a semi-honest model, and has applications in many real-world situations. For example, companies might want to disaggregate power usage data that has been gathered from a neighborhood containing several homes. As another example, an analyst for a ride-sharing service might take averaged scores received by drivers, and attempt to penalize those drivers who have received low scores. As a third example, some IoT-capable sensors in a factory are infected by a piece of malware that does not interfere with normal operation, but transmits the sensor readings to an adversary that attempts to reverse engineer the manufacturing process.

4 Secret Sharing for Private Aggregation

The following will describe the basic protocol that is used to perform privacy preserving aggregation in a star topology, without consideration of differential privacy. Some of this background is discussed in U.S. patent application Ser. No. 15/073,330 (FAULT-TOLERANT AGGREGATION OF ENCRYPTED DATA IN A STAR NETWORK) which was incorporated by reference above. In subsequent sections, it is shown how to achieve the desired level of differential privacy, even with an adversarial aggregator. As the steps for achieving differential privacy depend on this basic protocol, they will be described in some detail. For the following, assume that all parties, including the aggregator are semi-honest. Later on, when differentially private mechanisms are considered, the aggregator will be made more powerful, in the sense that he can influence the amount the noise added to the final result output by the protocol. The discussion in this section is still in the realm of secure multiparty computation and there is no noise being added by any party. Thus, nothing is lost by assuming a semi-honest aggregator, just for this section.

The protocol with m participants is based on Shamir Secret Sharing and additively homomorphic encryption. The high-level idea is that each of the m participants generates a polynomial with secret coefficients whose constant coefficient is their input data. Each participant evaluates its polynomial at m distinct known points, encrypts the resulting values using the public keys of relevant participants, and sends them to the aggregator. The aggregator homomorphically combines the encrypted shares received from all participants, to obtain encrypted evaluations of a "sum" polynomial at those m points. Upon decrypting these evaluations, the aggregator performs polynomial interpolation to obtain the coefficients of the sum polynomial, evaluates the sum polynomial at x=0 to discover the desired sum of inputs of all participants. A more precise description of the protocol follows below, and is made with reference to FIG. 3.

Figure 3:
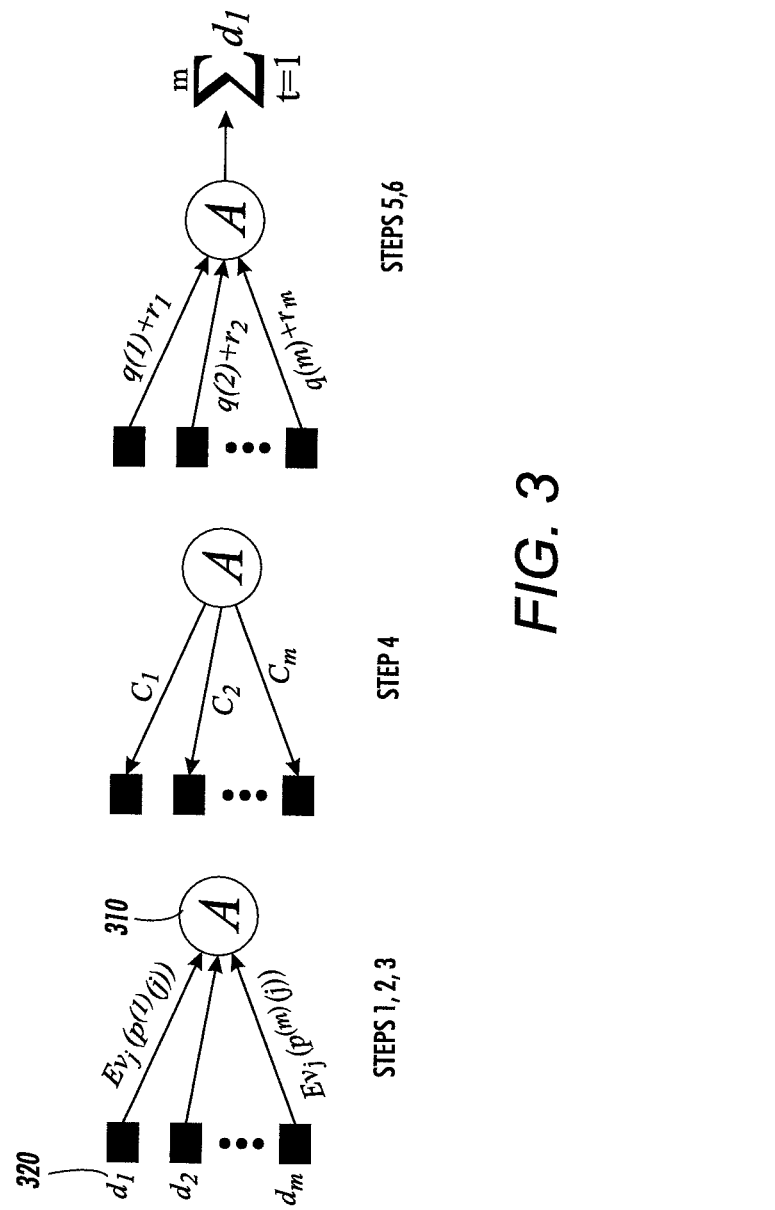
FIG. 3 illustrates a protocol of Secret Sharing for Private Aggregation.

FIG. 3 shows a protocol of the "Secret Sharing for Private Aggregation" section. Participants send homomorphically encrypted shares to the aggregator 310 (A) to indirectly implement Shamir secret sharing in a star network.

Inputs: Denote the aggregator by A, and each participant by $P_i$, i=1, 2, . . . , m. Let $d_i$ be the input data 320 held by each participant, such that $d_i$ is a non-negative integer and $d_i < d_{max}$. Associated with each $P_i$ is the public-private key pair of a semantically secure additively homomorphic cryptosystem. Denoting the public key for $P_i$ by $v_i$, the additive homomorphic property ensures that $E_{v_i}(a)E_{v_i}(b)=E_{v_i}(a+b)$. The semantic security property implies that a given plaintext maps to a different ciphertext at every encryption, thus providing protection against Chosen Plaintext Attacks (CPA).

Output: The aggregator discovers $\Sigma_{i=1}^{m} d_i$. The participants discover nothing else.

Protocol: Consider the following steps, also shown in FIG. 3:

1. The aggregator broadcasts a large prime number $\beta < md_{max}$ to all participants.

2. Each participant, $P_i$, i=1,2, . . . , m generates a polynomial of degree k<m given by:

$$p^{(i)}(x) = d_i + p_1^{(i)} x + p_2^{(i)} x^2 + \ldots + p_k^{(i)} x^k \mod \beta$$

where the coefficients $p_s^{(i)}$ where s=1, 2, . . . , k, are chosen uniformly at random from the interval [0, β). By construction, note also that $p^{(i)}(0)=d_i<\beta$, i.e., evaluating the polynomial at zero yields each participant's input data.

3. Each participant $P_i$ evaluates the polynomial at m known, distinct points. Without loss of generality, let these points be the integers j=1,2, . . . , m. Then, each $P_i$ encrypts $p^{(i)}(j)$ using the public key $v_j$ of the participants $P_j$, j=1, 2, . . . , m, and sends the ciphertexts $E_{v_j}(p^{(i)}(j))$ to the aggregator, A.

4. For each i=1, 2, . . . , m, the aggregator computes:

$$E_{v_j}(r_j) \prod_{i=1}^{m} E_{v_j}(p^{(i)}(j)) = E_{v_j}\left(r_j + \sum_{i=1}^{m} p^{(i)}(j)\right) = E_{v_j}(r_j + q(j)) = C_j$$

The aggregator then sends each $C_j$, j=1, 2, . . . , m to participant $P_j$ for decryption. Here, the constant $r_j$ is chosen at random to hide the summation term from $P_j$.

5. The participants $P_j$ who are still online, decrypt the respective $C_j$ and returns it to the aggregator. The aggregator subtracts $r_j$ and obtains, for j⊂{1, 2, . . . , m}, the values $$q(j) = \Sigma_{i=1}^{m} p^{(i)}(j) \mod \beta$$

By construction, the above steps have enabled the aggregator to evaluate the polynomial, $$q(x) = q_1 x + q_2 x^2 + \ldots + q_k x^k + \sum_{i=1}^{m} d_i \mod \beta$$

at some points in the set {1, 2, . . . , m}. In order to recover the coefficients $q_1, q_2, \ldots, q_k$ and the desired summation, the aggregator needs the polynomial q(x) to be evaluated at k+1 or more points, i.e., the aggregator needs at least k+1 participants to be online. If this requirement is satisfied, the aggregator can perform polynomial interpolation to obtain $q_1, q_2, \ldots, q_k$, and recover the value of $q_0 = \Sigma_{i=1}^{m} d_i$ which is the quantity of interest.

Correctness: The use of additively homomorphic encryption with the appropriate participant's public keys distributes shares of the desired summation to the participants who are still online. Functionally, this is equivalent to distributing polynomial secret shares, and performing additions in the BGW protocol (see M. Ben-Or, S. Goldwasser, and A. Wigderson. Completeness theorems for non-cryptographic fault-tolerant distributed computation. In *Proceedings of the twentieth annual ACM symposium on Theory of computing*, pages 1-10, 1988, which is incorporated by reference in its entirety). Alternatively, correctness follows from the realization that Shamir secret sharing is additively homomorphic modulo β.

Fault-Tolerance: The degree of the "sum" polynomial is k<m. Hence, the protocol is fault tolerant: The aggregator can compute the summation even when up to m−k−1 parties go offline after Step 3, i.e., before polynomial interpolation is used to extract the final sum from the shares.

Privacy: First, consider privacy against individual semi-honest players. Secret sharing ensures that no participant discovers the data held by an honest participant. Furthermore, the homomorphic cryptosystem ensures that the aggregator only discovers the coefficients of the "sum" polynomial q(x), but does not discover the coefficients of the component polynomials $p^{(i)}(x)$. The privacy guarantee against individual semi-honest participants is information-theoretic, while that against the aggregator is computational.

Next, consider privacy against collusions of semi-honest players. Clearly, an adversary that corrupts m−1 out of m participants, can look at the output summation and discover the data of the remaining honest participant. Since the participants can only communicate through the aggregator, any other non-trivial semi-honest coalition must contain the aggregator. In order to discover the data $d_i$ of an honest participant $P_i$, the coalition needs to access at least k+1 decrypted polynomial secret shares $p^{(i)}(j)$ for j∈{1, 2, . . . , m} and perform polynomial interpolation. To achieve this, the coalition must comprise the aggregator and at least k+1 other semi-honest participants. In other words, the protocol preserves privacy of an honest participant against coalitions of the aggregator and up to k other participants.

Complexity: The ciphertext communication complexity of the protocol is $0(m^2)$ as determined by Step 3. Similarly, the ciphertext computation complexity is also $0(m^2)$ as determined by Step 4. Note that, the aggregator has to perform polynomial interpolation in Step 5. This can be accomplished using Lagrange interpolation, which has $0(m^2)$ complexity.

5 Differentially Private Aggregation Protocols

The approach of the systems and methods described herein is to make the participants and the aggregator generate and add noise to the aggregate function through interaction. This becomes challenging under the adversarial model described earlier. The aggregator has an incentive to add as little noise as possible. Furthermore, even if the aggregator is honest, it is very difficult to ensure differential privacy of a participant when all other participants are colluding. The approach of the systems and methods described herein is to design protocols in which neither the aggregator nor any participant finds out the noise value that has been added to the final summation. In fact, the systems and methods described herein have a slightly stronger requirement: No single participant can discover how much noise she herself contributed to the final summation.

Broadly, the protocol has two phases: (1) Cheating-proof noise generation, and (2) Secure aggregation. In the first phase, the noise term is generated via interactions between the parties, in such a way that cheating attempts can be detected. The second phase executes a secure aggregation protocol such that the aggregated result will incorporate the noise term to guarantee differential privacy. The following setup is assumed for all of the protocols (and sub-protocols) of this section.

Setup & Public Parameters: Denote the aggregator by A, and each participant by $P_i$, i=1, 2, . . . , m. The aggregator has a public-private key pair of a semantically secure additively homomorphic cryptosystem. The public key of the aggregator is denoted by $v_A$. The plaintext domain of the aggregator is $D_A$. Let F, $F_s$ denote noise distributions over R. (For example, F is the Laplacian distribution with parameter $$\frac{\Delta}{\epsilon},$$

denoted by Lap($\Delta/\epsilon$).)

Inputs: Each $P_i$ has input data $d_i$. The aggregator has no inputs.

Output: The aggregator obtains $\Sigma_{i=1}^m d_i + \xi$ where $\xi \sim F$ is the noise term. The participants do not discover anything.

Protocol: Consider the following steps:

1. The participants and the aggregator jointly execute the cheating-proof noise generation protocol, to be described in Section 5.3. Participant i obtains blinding term $r_i$. The aggregator obtains (from $P_i$) a value $r_i + \xi_i$ for every participant, and computes the sum, $\Sigma_{i=1}^m (r_i + \xi_i)$.

2. The participants and the aggregator jointly execute a private aggregation protocol, with every $P_i$'s input set to $d_i - r_i$. The aggregator obtains the value $\Sigma_{i=1}^m (d_i - r_i)$ via interactions with the participants who are still online. It then calculates:

$\Sigma_{i=1}^m (d_i - r_i) + \Sigma_{i=1}^m (r_i + \xi_i) = \Sigma_{i=1}^m (d_i + \xi)$ which is the desired noised sum $\xi = \Sigma_{i=1}^m \xi_i$.

In the subsections that follow, the protocol is described in more detail. First, these subsections elaborate on an adversarial model, and consider the incentives of the various parties. These subsections then explain how the noise term needed for differential privacy can be computed by aggregating noise samples generated by the participants. Finally, these subsections describe the protocol to achieve differential privacy and analyze it with respect to correctness, fault tolerance, and privacy.

5.1 Threat Model and Incentives

The aggregator seeks a result as precise as possible and thus is incentivized to reduce or control as much as possible the noise term. This is because, from the aggregator's point of view, adding noise to the aggregation result decreases utility. Note that, even if the aggregator cannot influence the final noise term, it is sufficient for him to learn (or reduce his uncertainty about) the noise term. In particular, the protocol must ensure that the aggregator cannot learn or influence the noise term through collusion with one or more participants.

It is tempting to think that honest but curious participants may not have an incentive to cheat. After all, the purpose of differential privacy is to safeguard the participants' privacy by imposing a strict upper bound on what the aggregator can learn about a participant's input. However, there still remains the possibility that a collusion of curious participants can make inferences about the data of honest participants. In particular, by subtracting their own data and noise samples from the published summation, they can obtain the noisy sum of the data of honest participants, wherein the noise might not be sufficient to guarantee differential privacy.

Since the participants are honest but curious, they do not present spurious data or wrongly distributed noise samples to the protocol. However, their curiosity has consequences beyond those normally observed in secure multiparty computation, where the goal of semihonest actors is to discover the data of honest actors. In our adversarial model, the goal of semi-honest actors is, additionally, to make statistical inferences about the honest actors that are more accurate than what the specified differential privacy guarantee allows.

Some deviations from the protocol might fall into the category of failures, from which recovery is possible owing to the fault tolerance provided by Shamir Secret Sharing. The aggregator has no incentive to deviate in a way that would result in failing to complete the protocol and thereby failing to obtain the aggregate sum.

5.2 Sampling Noise for Differential Privacy

There are several ways to sample noise in order to satisfy differential privacy. The popular Laplacian mechanism adds noise from the Laplace distribution, but other distributions (e.g., Gaussian) can be used as well. In the contemplated setting, it is not sufficient to sample a single noise term from an appropriate distribution. Indeed, neither the participants nor the aggregator can find out the sampled noise value, and so no party should perform the sampling on its own. Instead, the systems and methods described herein propose to sample the noise as the sum of several noise terms generated by the participants. Formally, we model the noise term as a random variable $X \sim F$. The idea is to generate X as the sum of some independent and identically distributed random variables $X_i$.

In some embodiments, F is the Gaussian distribution. Write $$S_n = \frac{1}{n} \sum_{i=1}^{n} X_i,$$

where $X_i$ are independent and identically distributed random variables from some distribution $F_s$ with finite variance $\sigma^2$. We know by the Central Limit Theorem (CLT) that $\sqrt{n}(S_n - E[S_n])$ converges in distribution to $N(0, \sigma^2)$. This observation allows us to generate noise that approximately follows a Gaussian distribution with a given variance. Note that ($\epsilon$, $\delta$)-differential privacy can be achieved using Gaussian noise.

In other embodiments, it is desired to achieve $\epsilon$-differential privacy (i.e., $\delta$=0). This requires F to be a Laplace distribution, specifically F=Lap($\Delta/\epsilon$). This can be accomplished using a similar idea for generating X by exploiting the infinite divisibility of the Laplace distribution. Concretely, if X is a Laplace random variable with mean zero and scale parameter b, then for any n≥1, there exist independent and identically distributed random variables $X_i$ such that $X=\Sigma_{i=1}^n X_i$. For example, this holds if $X_i=Y_{1,i}-Y_{2,i}$, where the random variables $Y_{1,i}$, $Y_{2,i}$ are distributed as Gamma (1/n, b).

More generally, we consider generating noise from any distribution F which can satisfy differential privacy, as long as we can sample X~F by sampling independent and identically distributed $X_i$'s for some distribution $F_s$ such that $X=a_n \Sigma_{i=1}^n X_i$, for some constant $a_n$. It may also be possible to exploit the geometric stability of the Laplace distribution, although this is not explicitly considered here.

To deal with collusions, the parameters will further be set such that if only n'<n terms are added to the sum, the noise is sufficient to ensure differential privacy. That is, if $F_S$ is the distribution of the $X_i$'s, the parameters are chosen such that $\Sigma_{i=1}^{n'} X_i = \hat{X} \sim F$. This satisfies differential privacy since the final noise term will be $X+\hat{X}$, where $\hat{X}$ is a sum of up to n-n' random variables distributed according to $F_s$ independent of X. Clearly, if adding X is sufficient to satisfy differential privacy, then so is adding $X+\hat{X}$.

Novel aspects of the treatment described herein include the adversarial incentives of the participants and the aggregator, and the measures taken to detect adversarial actions. These adversarial incentives, and detection measures are not considered in the prior art.

5.3 Noise Generation Phase

The following presents a double-blind noise addition protocol in which the participants generate noise components and the aggregator obliviously computes an overall noise term. This is achieved without the aggregator learning the noise term or being able to influence it (without being detected). To ensure that the aggregator does not cheat and influence the noise sampled, we use a lightweight verifiable computation subprotocol. In general, there are two challenges in such proofs of computation: (a) the proof must not reveal information (e.g., amount of noise), and (b) the protocol must be efficient. While the first concern could be addressed by using generic zero-knowledge proof techniques, the second concern (i.e., efficiency) remains. Therefore, the systems and methods herein propose to design a custom solution that exploits the structure and statistical properties of the computation. The following will first explain the protocol used to derive the overall noise term. The sub-protocol used to detect a cheating aggregator is explained afterward. When a participant generates a noise component, the noise component may be kept hidden from the participant.

Setup: Let t, l be positive integers (security parameters). Let n be a positive integer (n≥m), and $F_s$ be a distribution such that $(\Sigma_{i=1}^n X_i) \sim F$, where $X_i \sim F_s$.

Inputs: The participants and the aggregator have no inputs.

Output: The aggregator obtains $\xi+r$, where $\xi$ is a noise term distributed according to F. The participants have no output. In the following, r is a perturbation term that is the sum of perturbation terms inserted by each of the participates.

Protocol: Consider the following steps:

1. Each participant $P_i$ chooses values $r_{i,j} \in \mathbb{D}_A$, and samples values $\xi_{i,j}$ from $F_S$, for j=1, 2, ..., $$t \cdot \left\lceil \frac{n}{m} \right\rceil.$$

This is depicted in FIG. 2.

Figure 4:
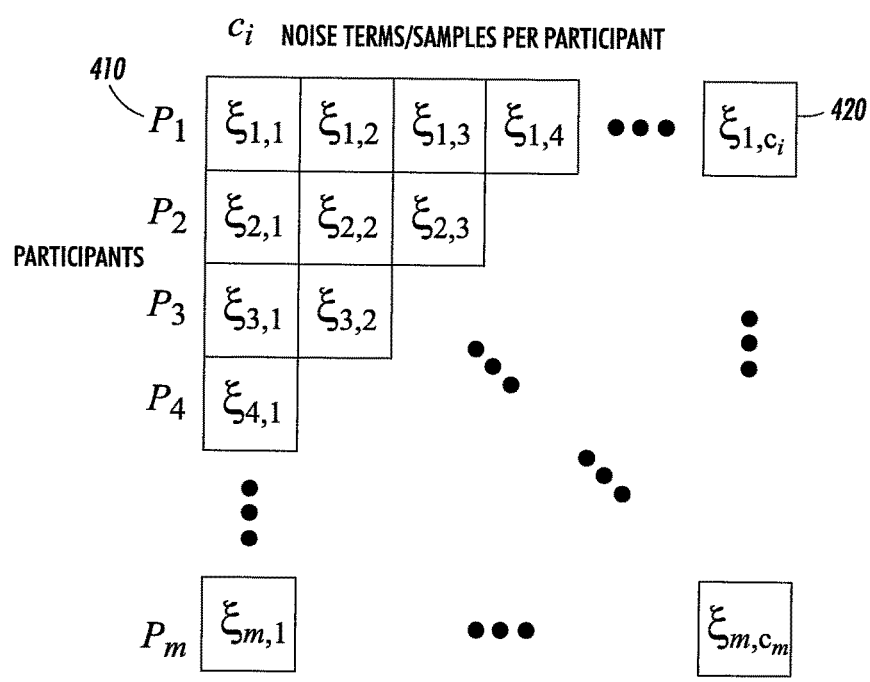
FIG. 4 illustrates noise terms/samples generated by participants.

FIG. 4 shows participants 410, and shows that every participant i generates $c_i$ noise terms/components/samples 420 of the form $\xi_{i,j}$. The noise generation protocol ensures that, for the purpose of providing differential privacy, n out of these terms are aggregated into the final noise $\xi$, term without the participants discovering which n terms were included. In other words, the aggregator may hide which n terms were included from any or all participants.

2. For i=1, 2, ..., m the aggregator sets $c_i = t \cdot s_i$, where $$s_i = \left\lfloor \frac{n}{m} \right\rfloor + 1_{\{i \leq n (\bmod m)\}}.$$

The aggregator then generates the binary sequence $b_{i,j} \in \{0, 1\}$, for i=1, 2, ..., m, and j=1, 2, ..., $c_i$, such that:

$\Sigma_{i,j} b_{i,j} = n$ $\Sigma_{t'=1}^{t} b_{i,t \cdot s + t'} = 1$, for s=0, 1, ..., $s_i - 1$:

That is, the binary sequence $b_{i,j}$ has n ones (and tn-n zeros), and for each i, $b_{i,j}$ consists of $s_i$ sub-sequences each containing a single 1. An example of the binary sequence is depicted in FIG. 4. For i=1, 2, ... m, A encrypts $b_{i,j}$ and sends the ciphertext, namely, A sends $E_{v_A}(b_{i,j})$ to $P_i$, for j=1, 2, ..., $c_i$. In this step, a cheating aggregator can attempt to reduce the number of 1's in the selector vector of one or more participants. As will be seen, the fewer the number of 1's, the lower the amount of noise in the final computed aggregate. To detect such cheating, one requirement is that the aggregator prove to every participant $P_i$, that the above conditions on the $b_{i,j}$ are satisfied. Thus, in one example, conditions on the $b_{i,j}$ may show that the aggregator is honest. However, the participants must not know the binary values $b_{i,j}$, so this proof should be carried out in zero knowledge. Later on, an efficient method to detect a cheating aggregator will be described. This method will be referred to as "detecting cheating."

Figure 5:
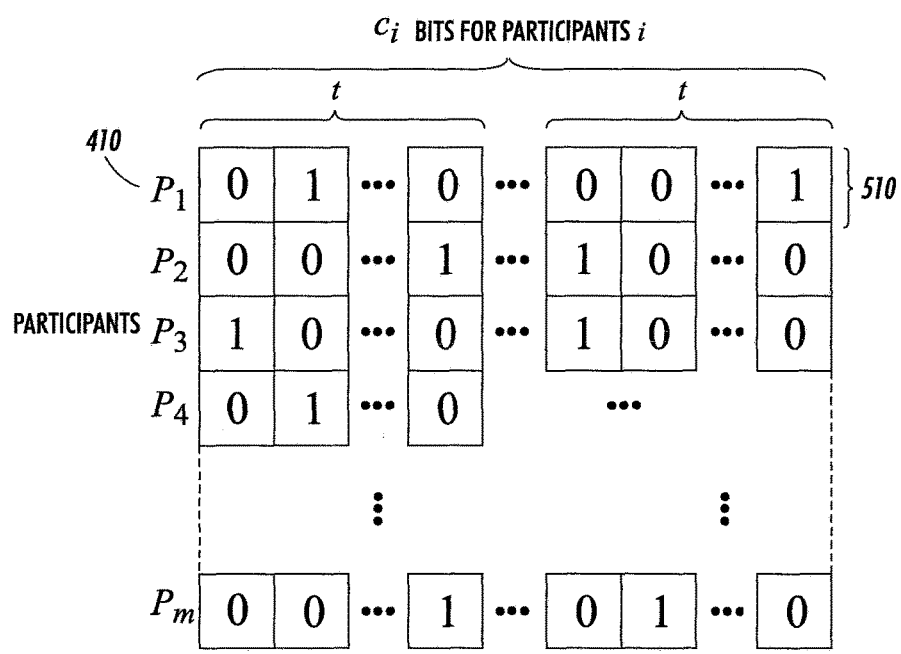
FIG. 5 illustrates selector vectors.

As shown in FIG. 5, the aggregator generates a $c_i$-length selector vector 510 for each participant i. The binary values, $b_{i,j}$, are encrypted and used to select which of the noise samples $\xi_{i,j}$ generated by the participants (See FIG. 4) will be added up to generate the final noise term $\xi$.

3. Each participant $P_i$ computes for j=1, 2, ..., $c_i$:

$$e_{i,j} = E_{v_A}(b_{i,j})^{\xi_{i,j}} \cdot E_{v_A}(r_{i,j}) = E_{v_A}(b_{i,j} \xi_{i,j} + r_{i,j})$$

$P_i$ then sends the values $e_{i,j}$ to the aggregator.

4. For i=1, 2, ... m, the aggregator computes $\Pi_{j=1}^{c_i} e_{i,j} = E_{v_A}(\xi_i + r_i)$, where $\xi_i = \Sigma_{j: b_{i,j}=1} \xi_{i,j}$ and $r_i = \Sigma_{j=1}^{c_i} r_{i,j}$ note that $\xi_i$ is sum of only those $\xi_{i,j}$'s such that $b_{i,j}=1$. A decrypts each term $\xi_i + r_i$ and computes its output as: $\Sigma_{i=1}^{m} (\xi_i + r_i) = \xi + r$.

Correctness: It is shown that that the protocol correctly computes the sum $\xi + r$, where $\xi = \Sigma_{s=1}^{n} \xi_s$, and $r = \Sigma_i r_i$. Notice that, for j such that $b_{i,j}=1$, participant i homomorphically computes the encryption of $\xi_{i,j} + r_{i,j}$. Thus, as there are n pairs (i,j) such that $b_{i,j}=1$, the output that the aggregator computes is: $\Sigma_{(i,j): b_{i,j}=1} \xi_{i,j} + \Sigma_i (\Sigma_j r_{i,j})$. This quantity is $\Sigma_{s=1}^{n} \xi_s + 1$, for some random r. The result follows by noting that each summand of $\Sigma_{s=1}^{n} \xi_s$ contains only one noise sample and is distributed according to $F_s$.

5.4 Secure Aggregation Phase

Once the noise term has been generated, the participants run a private aggregation protocol with the aggregator (e.g., the private aggregation protocol of section 4 above). Specifically, each online participant i sets his input to be $d_i - r_i$, where $r_i = \Sigma_j r_{i,j}$ generated in the first phase.

Correctness: This follows from the fact that:

$$\Sigma_{i=1}^{m}(d_i - r_i) + \Sigma_{i=1}^{m}(r_i + \xi_i) = \Sigma_{i=1}^{m}(d_i + \xi)$$

Fault-tolerance: One requirement is that the participants send all their values $e_{i,j}$ and their evaluated polynomial points in a single message (i.e., an atomic operation) to the aggregator. This ensures that, for each participant i, the aggregator gets all the $e_{i,j}$'s and the $E_{v_i}(P^{(i)}(j))$'s in one step. If he does not (e.g., if $P_i$ fails) then participant i's values are ignored from the protocol. This is sufficient to ensure that fault-tolerance follows from a private aggregation protocol. Indeed, if a participant $P_i$ fails (or goes offline) before delivering its $e_{i,j}$'s and the $E_{v_i}(P^{(i)}(j))$'s, then none of $r_i$, $\xi_i$ or $d_i$ will be included in the sum $\Sigma_j(d_j-r_j)+\Sigma_j(r_j+\xi_j)=\Sigma_j d_j+\xi_j$, which only includes the participants who are online until that step. If $P_i$ fails after that step, then the blinded noise term $r_j+\xi_j$ will be known to the aggregator, and the fault-tolerance property of the private aggregation protocol ensures that his input (i.e., $d_i-r_i$) is included in the final result.

It should be emphasized that while $d_i-r_i$ is blinded (i.e., independent of $d_i$ if $r_i$ is not known), it cannot directly be sent to the aggregator. Indeed, given $r_j+\xi_j$ (obtained after the first phase) and $d_i-r_i$, the aggregator can compute $d_i+\xi_i$, but $\xi_i$ is not enough noise (in general) to satisfy differential privacy. This is why a private aggregation protocol is used.

5.5 Detecting a Cheating Aggregator

As described above, the aggregator has no control over the noise terms generated by the participants. However, the aggregator generates the bit selector vector, i.e., the $b_{i,j}$'s. Thus the participants need to ensure that the $b_{i,j}$'s were correctly generated such that enough noise may be added. To do this, a protocol is used for proving in zero-knowledge that an encrypted vector includes only a single 1 and that the other elements are all 0s. This protocol is reproduced here for convenience.

Inputs: The prover P has a t bit vector $b_1, b_2, \ldots, b_t$, and an index $x \in \{1, 2, \ldots, t\}$ such that $b_x=1$ but $b_{x'}=0$, for $x' \neq x$. There is a public-private key pair of semantically secure additively homomorphic cryptosystem associated with P. The public key is known to the verifier and is denoted by $v_p$. The verifier $\mathcal{V}$ has no inputs.

Output: The verifier determines that the prover's bit vector contains exactly t−1 zeros and a single one, with probability $1-(4/5)^l$, for some positive integer l.

Protocol:

1. P computes $E_{v_p}(b_i)$, for i=1, 2, . . . , t , and sends the results to $\mathcal{V}$.

2. P and $\mathcal{V}$ repeat l times the following steps:

(a) P computes $e_0=E_{v_p}(0)$ and $e_1=E_{v_p}(1)$, and sends the results to V.

(b) $\mathcal{V}$ picks $r \in_R \{1, 2, 3, 4, 5\}$.

(c) If r=1, then $\mathcal{V}$ asks P to reveal the plaintexts of $e_0$ and $e_1$.

(d) Otherwise, $\mathcal{V}$ randomly partitions $\{1, 2, 3 \ldots, t\}$ into (disjoint) subsets A and B, and calculates:

$e_a = \Pi_{i \in A} E_{v_p}(b_i) = E_{v_p}(\Sigma_{i \in A} b_i)$, and
$e_b = \Pi_{i \in B} E_{v_p}(b_i) = E_{v_p}(\Sigma_{i \in B} b_i)$.

$\mathcal{V}$ then sends A and B to P.

(e) P proves that $e_a$ and $e_b$ represent ciphertexts of the same numbers as those of $e_0$ and $e_1$.

Using this protocol, we describe below, the sub-protocol to detect a cheating aggregator. As before, the steps in the protocol below are numbered according to the stage at which they occur.

Inputs: There are no inputs.

Output: The participants determine if the aggregator is cheating.

(Sub)-Protocol:

Detecting cheating: Each participant $P_i$ runs step 2 as the verifier with the aggregator, A, as the prover, for s=0, 1, . . . , $s_i$, to verify that $E_{v_A}(b_{i,t \cdot s+t'})$, for t'=1, 2, . . . , t, is the encryption of t−1 zeros, and 1 one.

If $P_i$ detects cheating from A, it aborts and attempts to notify the other participants.

5.6 Privacy Analysis

For non-colluding entities we evaluate the privacy against a single semi-honest participant, a semi-honest aggregator and a cheating aggregator. For colluding entities, privacy is evaluated when semi-honest participants collude among themselves and when some participants collude with the cheating aggregator.

Security against semi-honest aggregator: Since participants follow the protocol honestly, the noise added will be of the correct distribution F. However, we must show that the aggregator cannot learn the amount of noise added. Further the aggregator does not learn the participant's private inputs (or their noise-free sum). Consider the aggregator A. He observes $\Sigma_i d_i-r_i$, and for every participant i, he observes the $e_{i,j}$'s. By itself, the summation conveys no information. Recall that whenever $b_{i,j}=1$, $e_{i,j}$ is an encryption of $\xi_{i,j}+r_{i,j}$, which conveys no information about $\xi_{i,j}$ because $r_{i,j}$ is chosen uniformly at random within its domain. (In other words, $\xi_{i,j}+r_{i,j}$ is statistically independent of $\xi_{i,j}$). When $b_{i,j}=0$, then $e_{i,j}$ is an encryption of $r_{i,j}$ and $\xi_{i,j}$ will not be included in $\xi_i$. Finally, from $\xi_i+r_i=\Sigma_{j:b_{i,j}=1}\xi_{i,j}+r_{i,j}$, and $\Sigma_i d_i-r_i$, the aggregator learns no information about $d_i$ or $\xi_i$, other than what it can learn from $\Sigma_i d_i+\xi_i$.

Security against single semi-honest participants: Turning now to the participants, each $P_i$ observes only semantically secure encryptions of the $b_{i,j}$'s. Because $P_i$ does not know which of the $b_{i,j}$'s are encryptions of 1s, all he knows is that $\xi_i$ will be one of the $t^{s_i}$ possible combinations of the $\xi_{i,j}$.

Security against cheating aggregator: As we have argued above, the aggregator cannot convincingly cheat by preparing a bit vector $b_{i,j}$ which is not of the proper form. The aggregator may also try to exclude some participants from the computation in an effort to learn more about the remaining participants inputs. However, because of the secure aggregation protocol, at least k+1 participants must be included, where k is the degree of the polynomial used for Shamir Secret Sharing.

Security against colluding semi-honest participants: The participants cannot directly communicate with each other, thus it is not clear to what extent they can actually collude. However, one can consider an attack in which a single entity compromises several participants (e.g., readings from several sensors are sent to a remote server engaging in industrial espionage). Once the protocol is completed, and the aggregator publishes the noisy summation, this entity can subtract the data $d_i$ held by the participants in the colluding set. However, in the protocol of described in the "noise generation phase" section above, none of the participants can tell which of their generated noise samples were aggregated into the final summation. This is because, the bits $b_{i,j}$ that determine which samples are chosen and which are discarded, are encrypted under the aggregator's key.

Let S be the colluding set and $\tilde{S}$ be the non-colluding set, such that $|S \cup \tilde{S}|=m$, and $|S \cap \tilde{S}|=\emptyset$. Then the colluding set can recover:

$$\sum_{i=1}^{m}(d_i+\xi_i) - \sum_{j \in S} d_j = \sum_{i \in \tilde{S}} d_i + \sum_{i=1}^{m} \xi_i$$

In other words, the colluders cannot cancel out their noise samples from the published aggregate. This implies that the term on the right hand side contains more noise than is needed to ensure differential privacy of the non-colluding participants.

Security against aggregator colluding with (some) participants: Unfortunately, the above favorable situation is lost if the aggregator is part of the colluding set. Suppose the aggregator colludes with some number k' of participants. Through such a coalition, the aggregator is able to subtract the noise generated by the colluding participants and also their private inputs. Thus, it is as if only m−k' participants participated in the protocol, since the noise terms (and the inputs) of the non-colluding participants are independent of those of the colluding participants. Furthermore, the aggregator may exclude up to m−(k+1) participants from the protocol and still be able to get a noised sum (over the inputs of the non-excluded participants). Therefore, at least k+1−k' participants not colluding with the aggregator will take part in the protocol. If the noise generated by those participants is enough to satisfy differential privacy, then privacy is safeguarded. For example, if $$k + 1 = \frac{2m}{3}, \text{ and } k' = \frac{m}{3},$$

then the parameters should be set such that the $$k + 1 - k' = \frac{m}{3}$$

non-colluding (and non-failing) participants' noise terms will add up to a sample from the distribution F.

Limitation: One limitation of the protocol is due to the inherent nature of the star topology which means that participants can only communicate through (i.e., with the help of) the aggregator. In particular, this means a participant unfairly excluded from the protocol or one who detects the aggregator cheating is not guaranteed to be able to inform any other participants. It should be remarked that this is not a problem for this participant's privacy since he may simply abort the protocol thereby not revealing anything about his private input.

5.7 Choosing Security Parameters

It is now discussed how to set the security parameters t, l, and n. In the noise generation protocol, $P_i$ calculates $c_i$ encrypted values. For simplicity, it is convenient to take $s=s_i$ to be fixed for all i, so that we have that $c_i=t \cdot s$ for all participants. In such cases, we have $$s = \frac{n}{m},$$

as n is a multiple of m. Naturally, the larger the values of t, l, and s, the higher the security. That said, both the communication and computation costs of each participant depends on these parameters. In fact, this cost is $O(t \cdot s \cdot l)$, where $O(t \cdot s)$ is the communication cost and computation cost for the $e_{i,j}$'s and $O(l \cdot s \cdot t)$ is the cost of the protocol to detect a cheating aggregator.

Thus, the task of setting those parameters is a trade-off between the communication and computation costs and the level of security achieved. In terms of security, we want to maximize: (1) the probability of detecting a cheating aggregator, and (2) the number of possible final noise terms $\xi_i$ for each participant given his noise components $\xi_{i,j}$. For (1) recall that the probability of detecting a cheating aggregator is $1-(4/5)^l$ using the protocol described above in the "Detecting a Cheating Aggregator" section.

For the noise of a participant $P_i$ to be eliminated or significantly reduced, the number of cheating attempts made by the aggregator must be comparable to the number of times the detection protocol is run, i.e., s. Otherwise, only a small fraction of the noise components $\xi_{i,j}$ will be affected. This, and the fact that the aggregator's cheating need only be detected once (as any failure leads to the protocol being aborted), implies that the effective probability that the aggregator fools participant i by cheating $s' \leq s$ times is the probability that the aggregator fools participant i all s' times. Therefore, it is possible to drastically reduce the value of l (reducing the communication and computation costs) while keeping (almost) the same security.

For (2) we want to ensure that the space of all possible final noise terms $\xi_i$ produced by each participant given the components $\xi_{i,j}$ cannot feasibly be explored. (If a participant can explore a non-negligible fraction of that space, he gets information about the distribution of his noise term $\xi_i$.) Recall that there are $t^s$ possible such combinations.

Table 1 below shows two sets of parameters: one for resource-constrained devices which minimizes the communication and computation costs given an acceptable security level, and one providing a higher level of security but with increased communication and computation costs.

TABLE 1

Suggested security parameters. The probability $p_{cheat}$ is the probability that the aggregator successfully fools a participant when running the cheating detection protocol. The quantity $t^s$ is the number of possible noise terms.

| Parameter Set | t | s | t · s | l | $p_{cheat}$ | $t^s$ |
|---|---|---|---|---|---|---|
| Resource Bound | 2 | 48 | 96 | 62 | $\approx 2^{-20}$ | $2^{48}$ |
| High Security | 2 | 80 | 160 | 125 | $\approx 2^{-40}$ | $2^{80}$ |

5.8 Implementation Considerations

The described noise adding technique (described above in the "Sampling Noise for Differential Privacy" section) sums independent and identically distributed random variables. It is easier to work with integers, since the plaintext domain of additive homomorphic cryptosystems is typically the set of integers modulo some large positive integer. When the noise term is a real number, it is possible to encode it into the plaintext domain using a fixed point representation. Concretely, take a large positive integer exponent a. Then encode the number $x \in \mathbb{R}$ as the positive integer $x_a = \lfloor x \cdot 2^a \rfloor$. If the maximum allowable number of bits in the plaintext domain is b, then we must take a<b. This encodes exactly all numbers, x, whose decimal part can be fully represented in a digits or less, and allows to represent numbers whose integer part is as large as $2^{b-a}$. It is possible to perform homomorphic additions as usual, provided all ciphertexts involved have had their plaintext encoded in the same fashion (with the same exponent a). To recover x after decryption, simply divide the integer by $2^a$ and take the result as a real number.

Recall that multiplication of two numbers x and y can be performed with an additively homomorphic cryptosystem provided one number is encrypted, and the other number is available in plain text. Here, two cases arise in our protocols:

Either the encrypted number (say x) is an integer and the plaintext number (say y) is a real number, or vice versa. Let v be a public key. Then, if x is a real number, it is possible to simply perform $E_v(x_a)^y = E_v((xy)_a)$. On the other hand, if x is an integer and y is a real number, then given the ciphertext $E_v(x)$, the following should be performed: $E_v(x)^{y_a} = E_v((xy)_a)$.

Due to the fixed point representation, not all real numbers can be exactly represented, but this is not a significant concern because the plaintext domain used in practice is quite large (e.g., $2^{1024}$ or even $2^{2048}$) as it is related to the key size in bits. Another concern is that Differential Privacy may not be achieved due to the approximate nature of the noise sampled. This is not the case. In fact, textbook floating points implementations are vulnerable to attacks. However, integer or fixed-point representations are not vulnerable to such attacks.

Negative integers can be represented by using the upper half of the plaintext domain: i.e., if the plaintext domain is [0, 1, . . . , M-1], then -x for $$1 \leq x \leq \left\lfloor \frac{M}{2} \right\rfloor,$$

is represented as the positive integer M-x. When decrypting or decoding we interpret a result as negative if it is greater than or equal $$\left\lceil \frac{M}{2} \right\rceil.$$

Figure 6:
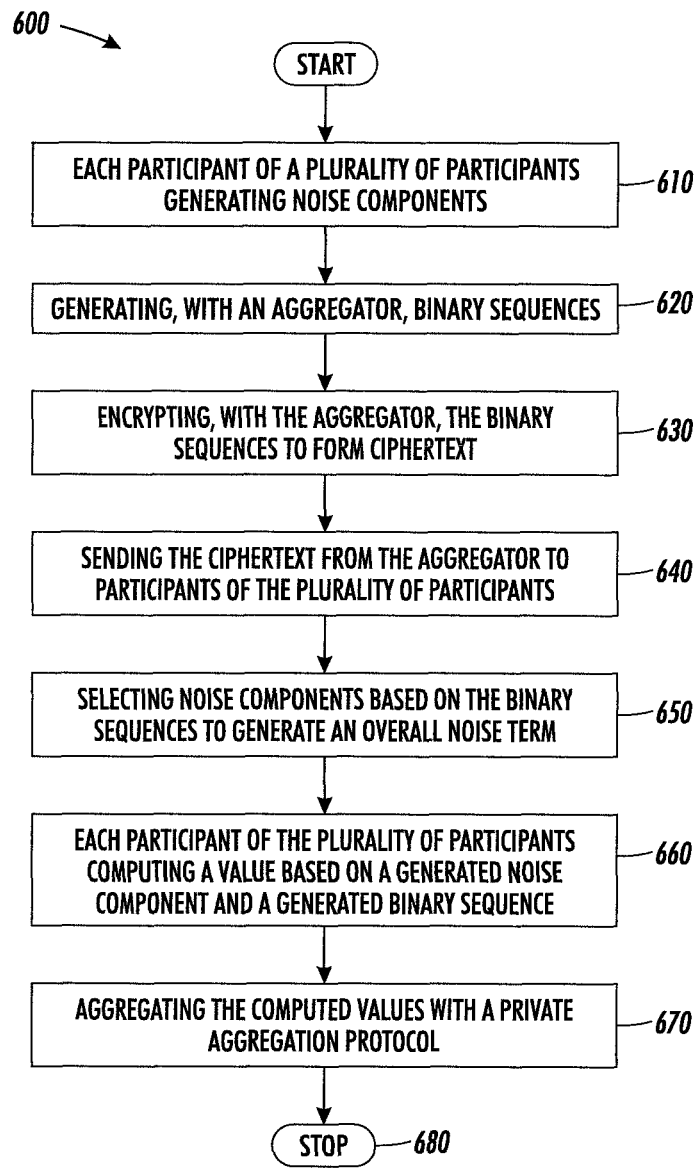
FIG. 6 illustrates a flowchart of a method in accordance with an embodiment of the present invention.

Flow diagram 600 of FIG. 6 illustrates a flowchart of a method in accordance with an embodiment of the present invention. With reference thereto, at 610, each participant of a plurality of participants generates noise components. At 620, an aggregator generates binary sequences. At 630, the aggregator the binary sequences to form ciphertexts. At 640, the ciphertexts are sent from the aggregator to participants of the plurality of participants. At 650, noise components are selected based on the binary sequences to generate an overall noise term. At 660, each participant of the plurality of participants computes a value based on a generated noise component and a generated binary sequence. At 670, the computed values are aggregated with a private aggregation protocol. The depicted flow diagram 600 ends at 680.

Figure 7:
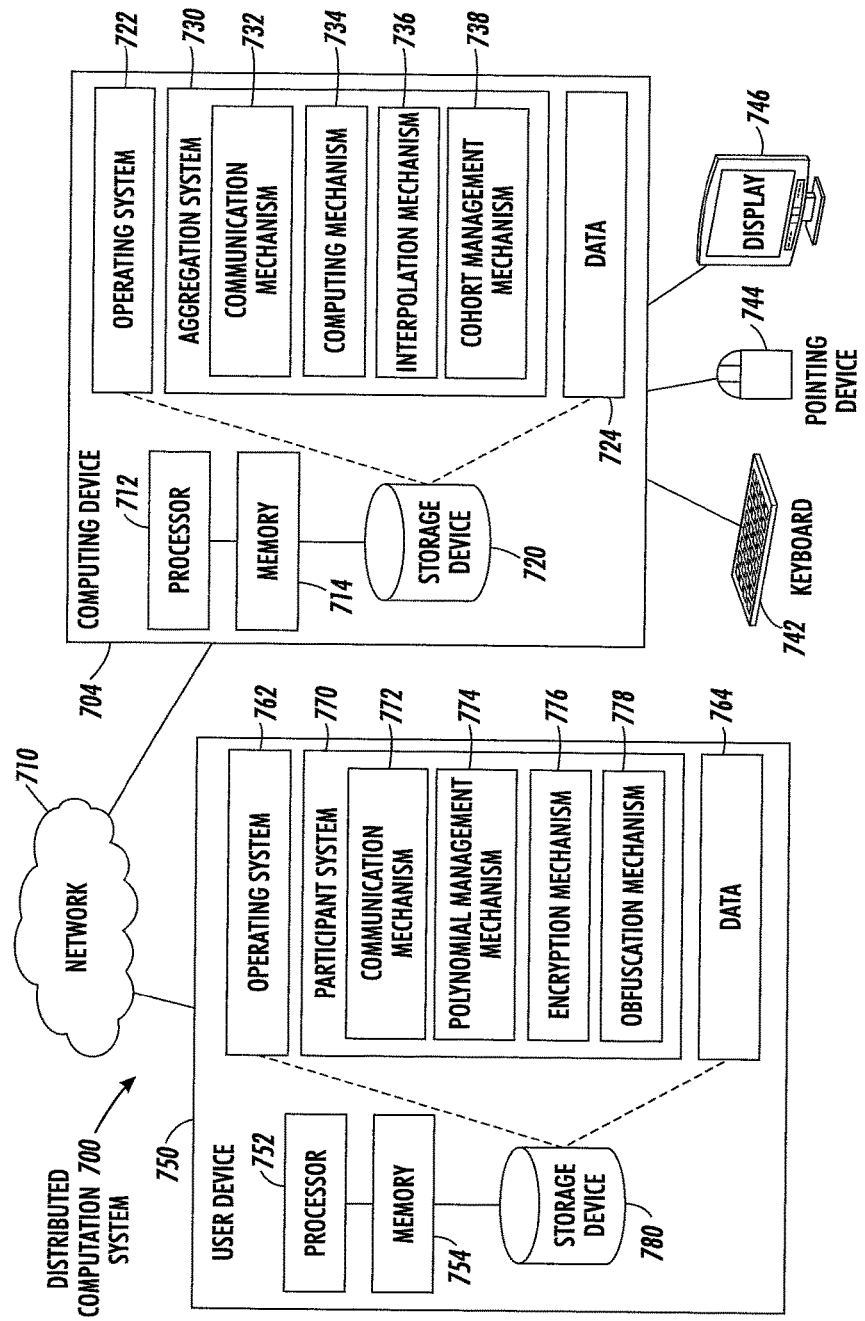
FIG. 7 illustrates an exemplary distributed computer communication system that facilitates encrypted data aggregation in a star network, in accordance with an embodiment of the present invention.

FIG. 7 illustrates an exemplary distributed computer and communication system that facilitates encrypted data aggregation in a star network, in accordance with an embodiment of the present invention. A distributed computation system 700 includes a computing device 704 and a user device 750. Computing device 704 can operate as an aggregator coupled to a network 710. User device 750 can operate as a participant coupled to network 710.

Computing device 704 includes a processor 712, a memory 714, and a storage device 720. Memory 714 can include a volatile memory (e.g., Random Access Memory (RAM)) that serves as a managed memory, and can be used to store one or more memory pools. Furthermore, computing device 704 can be coupled to a display device 746, a keyboard 742, and a pointing device 744. Storage device 720 can store an operating system 722, an aggregation system 730, and data 724. Data 724 can include any data received from user device 750 and data computed by aggregation system 730. Aggregation system 730 allows computing device 704 to operate as an aggregator.

Aggregation system 730 can include instructions, which when executed by computing device 704, can cause computing device 704 to perform methods and/or processes described in this disclosure. Specifically, aggregation system 730 may include instructions for sending messages to and receiving messages from user device 750 (communication mechanism 732). For example, aggregation system 730 can send a large prime number to user device 750. Aggregation system 730 can also include instructions for computing a partial encrypted value of interest, an obfuscated partial encrypted value of interest, and a target encrypted value of interest (e.g., based on a homomorphic cryptosystem) (computation mechanism 734). Aggregation system 730 can include instructions for computing coefficients for a target polynomial (e.g., based on polynomial interpolation) (interpolation mechanism 736).

User device 750 includes a processor 752, a memory 754, and a storage device 760. Memory 754 can include a volatile memory (e.g., RAM) that serves as a managed memory, and can be used to store one or more memory pools. Storage device 760 can store an operating system 762, a participant system 770, and data 764. Data 764 can include any data received from computing device 704 and data computed by participant system 770. Participant system 770 allows user device 750 to operate as a participant.

Participant system 770 can include instructions, which when executed by user device 750, can cause user device 750 to perform methods and/or processes described in this disclosure. Specifically, participant system 770 may include instructions for sending messages to and receiving messages from computing device 704 (communication mechanism 772). Participant system 770 can also include instructions for generating a polynomial and evaluating the polynomial for different participants (polynomial management mechanism 774). Participant system 770 can include instructions for encrypting and decrypting data based on a homomorphic public key cryptosystem (encryption mechanism 776).

In some embodiments, computing device 704 and user device 750 participate in a hierarchical encrypted aggregation technique. Aggregation system 730 then can include instructions for creating cohorts and assigning obfuscators for each cohort (cohort management mechanism 738). Aggregation system 730 then can also include instructions for masking partial value of interest from user device 750 (cohort management mechanism 738). On the other hand, participant system 770 then can include instructions for operating participant system 770 as an obfuscator (obfuscation mechanism 778). Such instructions include instructions for masking the input value of user device 750 with an obfuscation value and using a negative obfuscation value as the input value of user device 750.

6 Related Protocols

The privacy-preserving summation protocol extends to other queries as described below. These extensions have also been considered previously, but without regard for differential privacy as we do here.

Count queries: The aggregator wants to count the number of participants $P_i$ whose data $x_i$ falls in a set P. The aggregator broadcasts P, and each participant sets their input to the protocol as $d_i=1$ if $x_i \in P$, and $d_i=0$ otherwise. Running the proposed protocol then results in a count query on the set P. To determine the distribution of the noise term for achieving differential privacy in the final computed count, note that the global sensitivity of the count query is $\Delta=1$.

Histograms: The aggregator wants to compute a histogram based on data $x_i$ held by the participants. It broadcasts a set of disjoint bins $\mathcal{B}_1, \mathcal{B}_2, \ldots, \mathcal{B}_h$ to the participants. Each participant $P_i$ constructs a binary vector $d_i \in \{0, 1\}^h$ where the $j^{th}$ element $d_{ij}=1$ if $x_i \in \mathcal{B}_j$, otherwise $d_{ij}=0$. Then the participants and the aggregator run a count query for each of the h bins, at the end of which the aggregator obtains the desired histogram without discovering the individual vectors $d_i$. As a histogram is a generalization of a count query, the distribution of the noise term for achieving differential privacy in the aggregator's output histogram is again based on global sensitivity of a count query, i.e., $\Delta=1$.

Linear combinations: For i=1, 2, ..., N, the aggregator wants to run a classifier with non-negative weights $c_i < c_{max}$ on the participants' inputs $d_i$ to determine whether $c^T d \lesseqgtr b$. Concretely, the aggregator computes the ciphertexts $C_j$ using:

$$E_{v_j}(r_j) \prod_{i=1}^{m} E_{v_j}(p^{(i)}(j))^{c_i} = E_{v_j}\left(r_j + \sum_{i=1}^{m} c_i p^{(i)}(j)\right)$$

Consequently, subsequently, the aggregator gets $q(j)=\Sigma_{i=1}^{m} c_i p^{(i)}(j) \bmod \beta$. Here, the large prime number is chosen as $\beta > mc_{max} d_{max}$. Then, it evaluates the polynomial, $$q(x) = q_1 x + q_2 x^2 + \ldots + q_k x^k + \Sigma_{i=1}^{m} c_i d_i \bmod \beta$$

at k+1 or more points. While participant privacy is maintained as before, this process leaks more information than just the comparison $c^T d \lesseqgtr b$, as the aggregator discovers the value of $c^T d$.

One salient feature though, is that the aggregator does not need to reveal the classifier weights $c_i$ to any of the participants. Multiple linear combinations (hence classifiers) can thus be realized, without repeating a polynomial secret sharing step. This is an advantage over the prior art. Specifically, although the prior art could also be extended to compute linear combinations, in most cases, the protocols have to reveal the weights $c_i$ to the participants. Moreover, they have to repeat the secret sharing step whenever a new linear combination is computed.

In a differentially private realization, the classifier boundaries will be perturbed because of the noise term that is added to the inner product $c^T d$. The privacy/utility tradeoff is then based on the $\in$ and $\delta$ values, and the classification error that occurs as a consequence of adding noise. Recall that, the distribution of the noise term $\xi$ to be added to $c^T d$ is based on the global sensitivity of the linear combination, which is $\Delta = c_{max} d_{max}$ In this case, the aggregator has to multiply not just the perturbed data terms $d_i - r_1$, but also the perturbed noise terms $r_i + \xi_i$ of participant $P_i$ with the constant $c_i$, to ensure that:

$$\sum_{i=1}^{m} c_i(d_i - r_i) + \sum_{i=1}^{m} c_i(r_i + \xi_i) = \sum_{i=1}^{m} c_i d_i + \xi$$

Note that, as the distribution of noise term $\xi$ depends on $c_{max}$, the aggregator must reveal $c_{max}$ (but fortunately not the individual $c_i$'s) to all participants, so that they can generate the appropriate candidate noise samples.

7 Concluding Remarks

The discussed protocols ensure that, in spite of conflicting incentives, the correct amount of noise is added for differential privacy. This is achieved by having the participants generate several noise samples, with the aggregator deciding (obliviously) which of those samples are utilized in the differential private mechanism. Neither the cheating aggregator nor the semi-honest participants can see the noise values used to achieve differential privacy. The protocols have safeguards to ensure that the aggregator cannot influence the noise term, and to ensure that semi-honest colluding participants cannot reduce the differential privacy guarantees of honest participants. In this respect, the described privacy guarantees are stronger than previous approaches, in which the participants know their contribution to the noise term in the differentially private output.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A system comprising one or more processors, the one or more processors comprising an aggregator and a plurality of participants, each participant of the plurality of participants being configured to add a noise component to a data component, and the aggregator configured to:
   receive homomorphic encryptions of the noise components from each participant of the plurality of participants, wherein the noise components are sampled from a probability distribution;
   decrypt the homomorphic encryptions of the noise components to determine an overall noise term based on a subset of the noise components; and
   combine the noise components into the overall noise term, wherein the overall noise term is used to modify an aggregate function of the data components;
   wherein the aggregator is further configured to compute the overall noise term from an aggregation of n noise components while hiding which n noise components were included in the overall noise term from all participants of the plurality of participants.

2. The system of claim 1, wherein the aggregator is further configured to obliviously compute the overall noise term.

3. The system of claim 1, wherein the aggregator is further configured to obliviously compute the overall noise term, and further configured to not influence any noise component of the plurality of noise components.

4. The system of claim 1, wherein the aggregator is further configured to prove to each participant of the plurality of participants that conditions on a generated binary sequence are satisfied showing that the aggregator is honest.

5. The system of claim 1, wherein a participant of the plurality of participants is configured to hide the noise component the participant is configured to add from the participant.

6. A computer-implemented method for noise addition to enforce data privacy, the method comprising:
   generating binary sequences;
   generating homomorphic encryptions of the binary sequences to form ciphertexts;

sending the ciphertexts to each participant of the plurality of participants;

selecting, based on the ciphertext received at each participant, noise components sampled by the participant from a probability distribution to generate an encrypted value at each participant;

computing an overall noise term by aggregating n noise components while hiding which n noise components were included in the overall noise term from all participants of the plurality of participants;

receiving the encrypted value from each participant of the plurality of participants;

decrypting the encrypted value; and, aggregating the decrypted values with a private aggregation protocol.

7. A computer-implemented method for noise addition to enforce data privacy, the method comprising:

generating binary sequences;

generating homomorphic encryptions of the binary sequences to form ciphertexts;

sending the ciphertexts to each participant of the plurality of participants;

selecting, based on the ciphertext received at each participant, noise components sampled by the participant from a probability distribution to generate an encrypted value at each participant;

receiving the encrypted value from each participant of the plurality of participants;

decrypting the encrypted value; and, aggregating the decrypted values with a private aggregation protocol;

wherein the encrypted values are denoted as $e_{i,j}$, and are computed with the following formula:

$$e_{i,j}=E_{v_A}(b_{i,j})^{\xi_{i,j}} \cdot E_{v_A}(r_{i,j})$$

wherein:

$E_{v_A}$ is a function to generate a ciphertext based on public key $v_A$;

$b_{i,j}$ is a generated binary sequence;

$\xi_{i,j}$ is a noise component; and $r_{i,j}$ is a blinding term.

8. The computer-implemented method of claim 6, wherein the private aggregation protocol is based on Shamir Secret Sharing.

9. The computer-implemented method of claim 6, further comprising, with a participant of the plurality of participants:

detecting cheating by the aggregator; and in response to the detection of cheating, attempting to notify other participants of the plurality of participants of the detected cheating.

10. The computer-implemented method of claim 6, wherein each participant of the plurality of participants acts as a verifier to perform a verification to determine cheating by the aggregator.

11. The computer-implemented method of claim 10, wherein the verification is based on a generated binary sequence.

12. A system for implementing differential privacy, the system comprising:

one or more processors; and a storage device storing instructions that when executed by the one or more processors cause the one or more processors to perform a method, the method comprising:

generating binary sequences;

generating homomorphic encryptions of the binary sequences to form ciphertexts;

sending the ciphertexts to each participant of the plurality of participants;

selecting, based on the ciphertext received at each participant, noise components sampled by the participant from a probability distribution to generate an encrypted value at each participant;

computing an overall noise term by aggregating n noise components while hiding which n noise components were included in the overall noise term from all participants of the plurality of participants;

receiving the encrypted value from each participant of the plurality of participants;

decrypting the received encrypted value; and, aggregating the decrypted values with a private aggregation protocol.

13. The system of claim 1, wherein the aggregator and the plurality of participants form a strict star topology.

* * * * *